Dec. 16, 1930.  L. G. FRISE  1,785,620
CONTROL SURFACE FOR AIRCRAFT, SUBMERSIBLES, AND THE LIKE
Filed Oct. 15, 1928
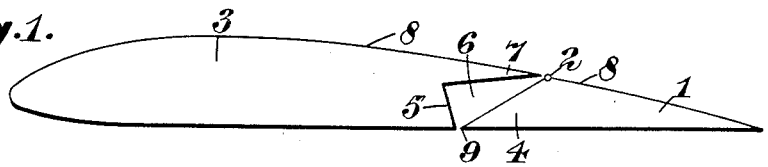
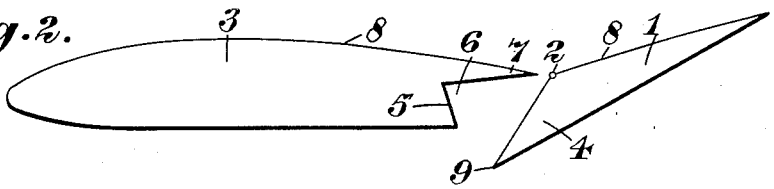
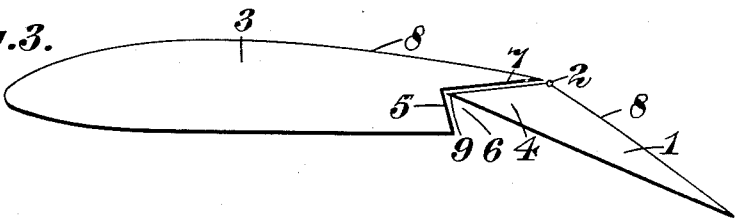
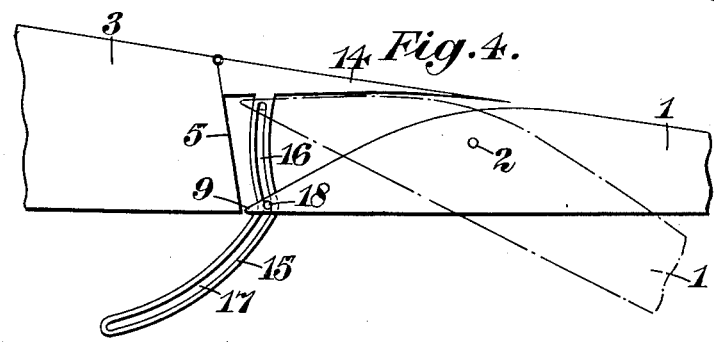
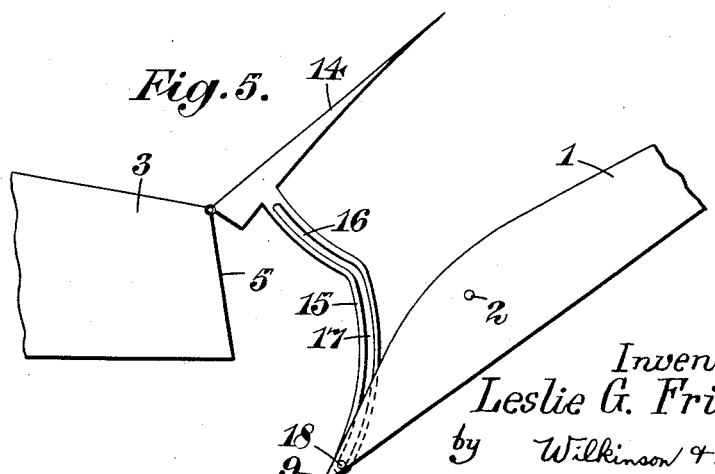
Inventor
Leslie G. Frise
by Wilkinson & Giusta
Attorneys.

Patented Dec. 16, 1930

1,785,620

UNITED STATES PATENT OFFICE

LESLIE GEORGE FRISE, OF BRISTOL, ENGLAND, ASSIGNOR TO THE BRISTOL AEROPLANE COMPANY, LIMITED, OF BRISTOL, ENGLAND, A BRITISH COMPANY

CONTROL SURFACE FOR AIRCRAFT, SUBMERSIBLES, AND THE LIKE

Application filed October 15, 1928, Serial No. 312,684, and in Great Britain October 26, 1927.

This invention consists in improvements in or relating to control surfaces for aircraft, submersibles and the like, and is concerned with that type of control surface for aircraft and the like, which consists in the combination of a fixed aerofoil and an adjustable aerofoil immediately behind it so arranged that upward movement of the trailing edge of the adjustable aerofoil from its neutral position causes the leading edge of the adjustable aerofoil to project downwards beyond the contour of the fixed aerofoil, but movement downwardly is possible without producing a similar upward projection.
In one construction of the above type described in British specification No. 194,753, dated 16th November 1921, the continuity of the upper surface of the complete aerofoil is broken when the adjustable aerofoil is in the neutral or mid-position, while a through passage is formed between the fixed and movable parts when the leading edge of the adjustable aerofoil projects beyond the lower surface of the fixed aerofoil.
One of the objects of the present invention is to provide a construction whereby the upper surface of the fixed and movable aerofoils is continuous, or substantially continuous, for any position of the movable aerofoil, with the result that certain aerodynamic differences and advantages in the use of such control surfaces are obtained.

Another object is to provide a modified construction whereby the aforesaid surface continuity or substantial continuity is broken when the leading edge of the adjustable aerofoil is lowered to project beyond the lower surface of the fixed aerofoil, thus forming a through passage between the two parts.
The present invention, which is an improvement in or modification of said prior invention, accordingly comprises the combination with a controlling aerofoil of the type first above described of means which forms a part of or is additional to the fixed aerofoil, and preserves unbroken, or substantially unbroken, the continuity of the upper surface between the trailing edge of the fixed aerofoil and the upper surface of the movable aerofoil, when the latter is adjusted in at least one direction from a neutral position.

In one preferred example of the invention means is provided whereby the continuity or substantial continuity of the upper surface is preserved in all positions of adjustment of the movable aerofoil.

According to another feature of this invention the trailing marginal part of the fixed aerofoil is formed with a recess on its underside to receive and accommodate the movement of the leading edge of the movable aerofoil, whilst providing a continuous, or substantially continuous upper surface for the fixed and movable aerofoils.

According to a further feature of this invention the fixed aerofoil may be provided at its trailing edge with a pivoted flap operatively connected to the movable aerofoil whereby movement of said aerofoil in one direction from its neutral position moves the said flap to open a through passage between the fixed and movable aerofoils, whereas movement in the other direction closes the flap or maintains it closed to preserve the aforesaid unbroken or substantially unbroken upper surface.

Preferably, the operative connection is such that the flap is moved only when the movable aerofoil is moved in such direction and so far that its leading edge projects beyond the lower surface of the fixed aerofoil. That is to say, downward movement of the movable aerofoil can take place without moving the flap.

A specific embodiment of this invention will now be described by way of example with reference to the accompanying diagrammatic drawings, wherein:

Figure 1 shows an aerofoil with a movable aileron in the neutral position;

Figures 2 and 3 are similar views to Figure 1, but with the trailing edge of the aileron raised and dropped, respectively;

Figure 4 shows on a larger scale a modified construction corresponding to Figures 1 and 3; and Figure 5 shows the same modified construction with the fixed and movable parts in relative positions, corresponding to those of Figure 2.

Like references denote like parts throughout the figures.

Figures 1 to 3 illustrate a balanced, or partially balanced, aileron 1 of the type in which the pivotal axis 2 of the aileron is set back from the fixed aerofoil 3 and the balancing portion 4 in front of this pivotal axis lies in proximity to the rear edge 5 of the fixed aerofoil. The rear edge of the fixed aerofoil is so shaped as to provide a recess 6 on the underside, which is closed at the top by an overhanging thin portion 7 of the main aerofoil, and this overhanging portion conveniently extends to or near to, the pivotal axis 2 of the aileron. This axis may lie in or near the upper surface 8 of the complete aerofoil.

The leading portion of the aileron is tapered towards its front edge 9, and the whole is so shaped that in the neutral position the lower surface of the aileron 1 is flush with, and constitutes a continuation of the lower surface of the fixed aerofoil 3 and the upper surface of the aileron behind its pivotal axis 2 constitutes a continuation of the upper surface of the fixed aerofoil.

The recess 6 in the fixed aerofoil 3 is of greater dimensions than the tapered front portion 4 of the aileron 1, so that the latter is free to move upwards within the recess until the upper surface of the front part of the aileron abuts the underside of the extension 7 of the fixed aerofoil overhanging the recess (Figure 3). By a suitable proportioning of the parts, particularly when a wing of thick section is used, the range of angular movement of the aileron which can thus be obtained is sufficient for ordinary use.

With this construction the result is obtained that when the aileron is in its neutral position its upper and lower surfaces form continuations of the upper and lower surfaces of the fixed aerofoil, and there is no through passage, or no appreciable through passage between them and there is no break or substantial break in the upper surface of the complete system such as existed in my prior construction. An improved lift is, therefore, obtained with the new construction. When the aileron is swung downwards (Figure 3), its leading edge 9 rises within the recess 6 aforesaid, but does not open any passage through the wing or cause the continuity of the upper surface of the complete aerofoil to be broken. When the aileron is moved upwards (Figure 2), its leading edge 9 projects below the lower surface of the fixed aerofoil to give similar effects to those obtained in said prior construction. It is an important feature of this invention that no break or substantial break is provided in the system on either surface when the aileron is in its neutral position, and the aerodynamic characteristics of the whole are thereby enhanced for all normal operation when the aileron occupies the neutral position.

In a modification of this invention, shown in Figures 4 and 5, means are provided for opening a through passage between the fixed aerofoil 3 and the aileron 1 when the latter is moved, in the following manner. The pivotal axis 2 of the aileron is set back from the trailing edge 5 of the fixed aerofoil, and the leading edge 9 of the aileron swings in proximity to such trailing edge, the aileron being shaped similarly to that described above.

A pivotal flap 14 is hinged to the trailing edge 5 of the fixed aerofoil and extends rearwardly to the pivotal axis of the aileron and normally lies in such a position as to close the gap and provide a smooth contour to the upper surfaces of the fixed aerofoil and aileron. This flap is operatively connected with the aileron in such manner that a downward tilt of the trailing edge of the aileron does not move the flap, but an upward tilt of the said edge swings the flap upwards to open a through passage between the two parts. The chain dotted lines in Figure 4 show the aileron with its trailing edge lowered to the fullest extent: Figure 5 shows the positions of the parts when the trailing edge is fully raised.

Any convenient mechanism may be used for this purpose such, for example, as an arm 15 rigidly secured to the flap 14 and projecting downwards, and formed with a slot 16, 17 in it which is engaged by a pin 18 near the leading edge 9 of the aileron. The upper part 16 of the slot is curved to a circle about the aileron axis 2 over part of its length so that when the pin 18 is swung upwards it moves in this arc 16 and does not affect or move the flap, but the lower part 17 of the slot is inclined in such a manner that when the pin on the leading edge of the aileron is moved downwards, it engages the side of the slot 17 and swings the arm 15 and tilts the flap upwards so as to open the passage which it previously closed.

Obviously many other mechanisms may be used for interconnecting the aileron and the flap and the invention is not limited to any particular construction of mechanism for this purpose.

I claim:—

1. In an aeroplane, the combination with a fixed aerofoil, of an adjustable trailing aileron which is pivoted about an axis situated rearwardly from the leading edge of the aileron and which is so shaped that the leading edge of the aileron is of less thickness than the adjacent trailing edge of the aerofoil, and that in the neutral position of the aileron, its lower surface is continuous with the lower surface of the aerofoil, and that in the upward position of the aileron, an unobstructed passage is provided between the aileron and the aerofoil, and means extending from the trailing edge of the aerofoil providing a continuous upper surface to the combined aerofoil and aileron.

2. In an aeroplane, the combination with a fixed aerofoil, of an adjustable trailing aileron which is pivoted about an axis situated rearwardly from the leading edge of the aileron and which is so shaped that the leading edge of the aileron is of less thickness than the adjacent trailing edge of the aerofoil, and that in the neutral position of the aileron, its lower surface is continuous with the lower surface of the aerofoil, a flap pivoted on the rear edge of the aerofoil providing a continuous upper surface to the combined aerofoil and aileron when the aileron is in its neutral position, and means coupling said flap to said aileron whereby the flap is turned upwards when the aileron is turned upwards but leaving it stationary when the aerofoil is turned downwards.

In testimony whereof I affix my signature.

LESLIE GEORGE FRISE.